United States Patent
Yosimoto et al.

(10) Patent No.: US 6,954,806 B2
(45) Date of Patent: Oct. 11, 2005

(54) DATA TRANSFER APPARATUS AND METHOD

(75) Inventors: Atuyuki Yosimoto, Kawasaki (JP); Kazumi Hayasaka, Kawasaki (JP); Hiroshi Saito, Kawasaki (JP); Yoshimasa Suetsugu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 368 days.

(21) Appl. No.: 10/400,669

(22) Filed: Mar. 28, 2003

(65) Prior Publication Data

US 2003/0188054 A1 Oct. 2, 2003

(30) Foreign Application Priority Data

Mar. 29, 2002 (JP) .................................... 2002-094869
Dec. 20, 2002 (JP) .................................... 2002-369938

(51) Int. Cl.[7] ............................................. G06F 13/28
(52) U.S. Cl. ............................ 710/22; 710/23; 710/24
(58) Field of Search ............................ 710/22–28, 308

(56) References Cited

U.S. PATENT DOCUMENTS

| | | | |
|---|---|---|---|
| 6,647,438 B1 * | 11/2003 | Connor et al. ................. | 710/22 |
| 6,691,178 B1 * | 2/2004 | Kasper ........................ | 710/22 |
| 2003/0097498 A1 * | 5/2003 | Sano et al. .................... | 710/22 |
| 2004/0015621 A1 * | 1/2004 | Tanaka ........................ | 710/22 |
| 2005/0060441 A1 * | 3/2005 | Schmisseur ................... | 710/22 |

FOREIGN PATENT DOCUMENTS

| | | |
|---|---|---|
| JP | 60-100251 | 6/1985 |
| JP | 61-198351 | 9/1986 |
| JP | 5-204829 | 8/1993 |
| JP | 5-257865 | 10/1993 |

* cited by examiner

Primary Examiner—Jeffrey Gaffin
Assistant Examiner—Harold Kim
(74) Attorney, Agent, or Firm—Staas & Halsey LLP

(57) ABSTRACT

A data transfer apparatus and method that can make efficient use of a memory and a common bus by controlling a DMA controller through descriptor control, and can thereby achieve a data transfer with increased communication processing speed. The data transfer apparatus, which executes a DMA transfer by controlling the DMA controller through the use of a descriptor, includes: a first storage mechanism for storing descriptor common information that can be shared among a plurality of descriptors; a second storage mechanism for storing descriptor individual information that differs for each individual descriptor; and a conversion circuit for taking as inputs the descriptor common information read out of the first storage mechanism and the descriptor individual information read out of the second storage mechanism, and for outputting descriptor information to be supplied to the DMA controller.

25 Claims, 21 Drawing Sheets

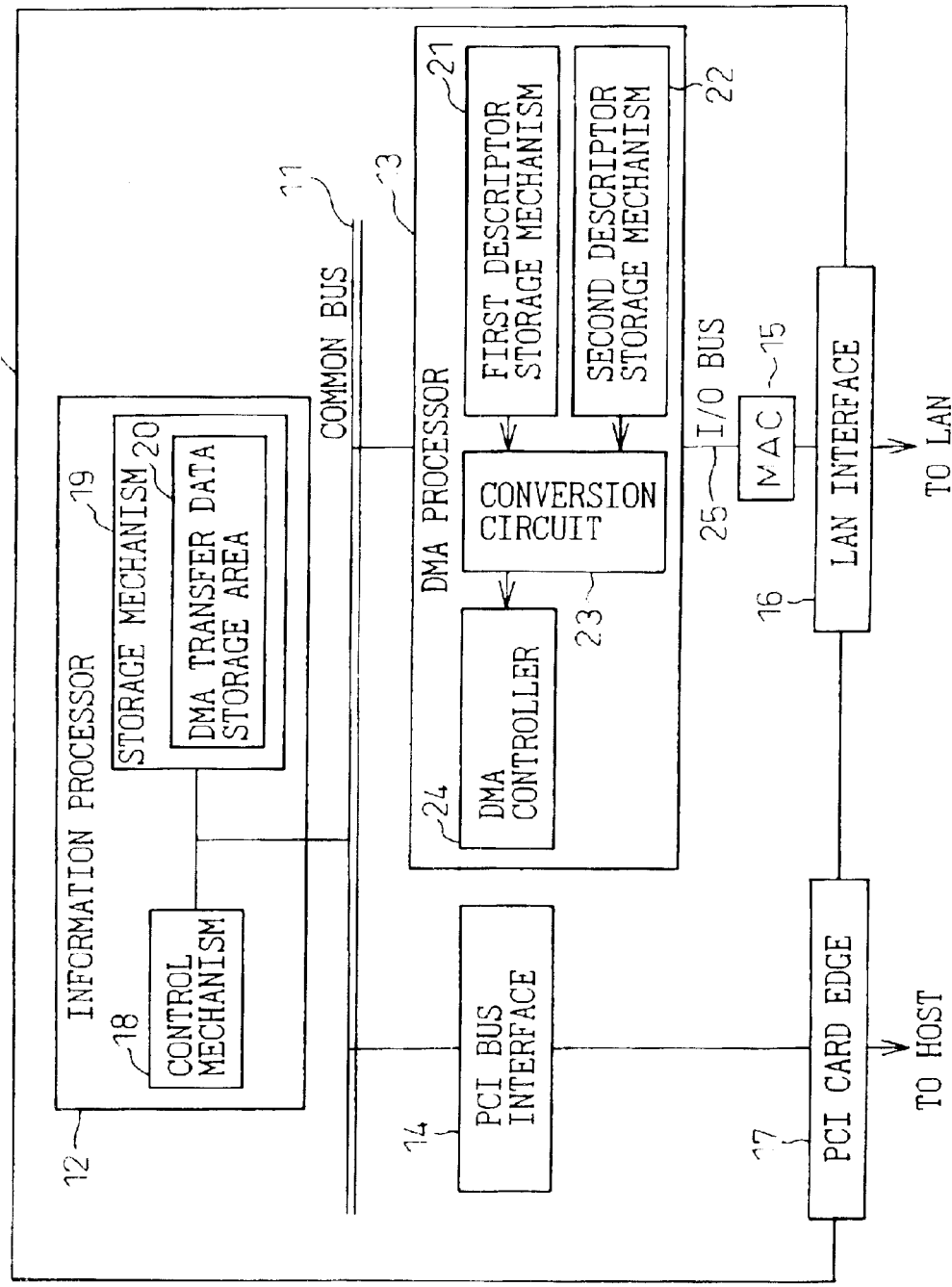

Fig. 2A

| 31 24 | 23 16 | 15 8 | 7 0 |
|---|---|---|---|
| Head address | | Reserve | |

Fig. 2B

| 31 | 30 | 29 24 | 23 16 | 15 8 | 7 0 |
|---|---|---|---|---|---|
| S | R | Byte count | | Offset | |

Fig. 3A

| 31 24 | 23 16 | 15 8 | 7 0 | |
|---|---|---|---|---|
| Head address | | Reserve | | ← A |
| Head address | | Reserve | | ← B |

Fig. 3B

| 31 | 30 | 29 24 | 23 16 | 15 8 | 7 0 | |
|---|---|---|---|---|---|---|
| S | R | Byte count | | Offset | | ← 1 |
| S | R | Byte count | | Offset | | ← 2 |
| S | R | Byte count | | Offset | | ← 3 |
| S | R | Byte count | | Offset | | ← 4 |
| S | R | Byte count | | Offset | | ← 5 |

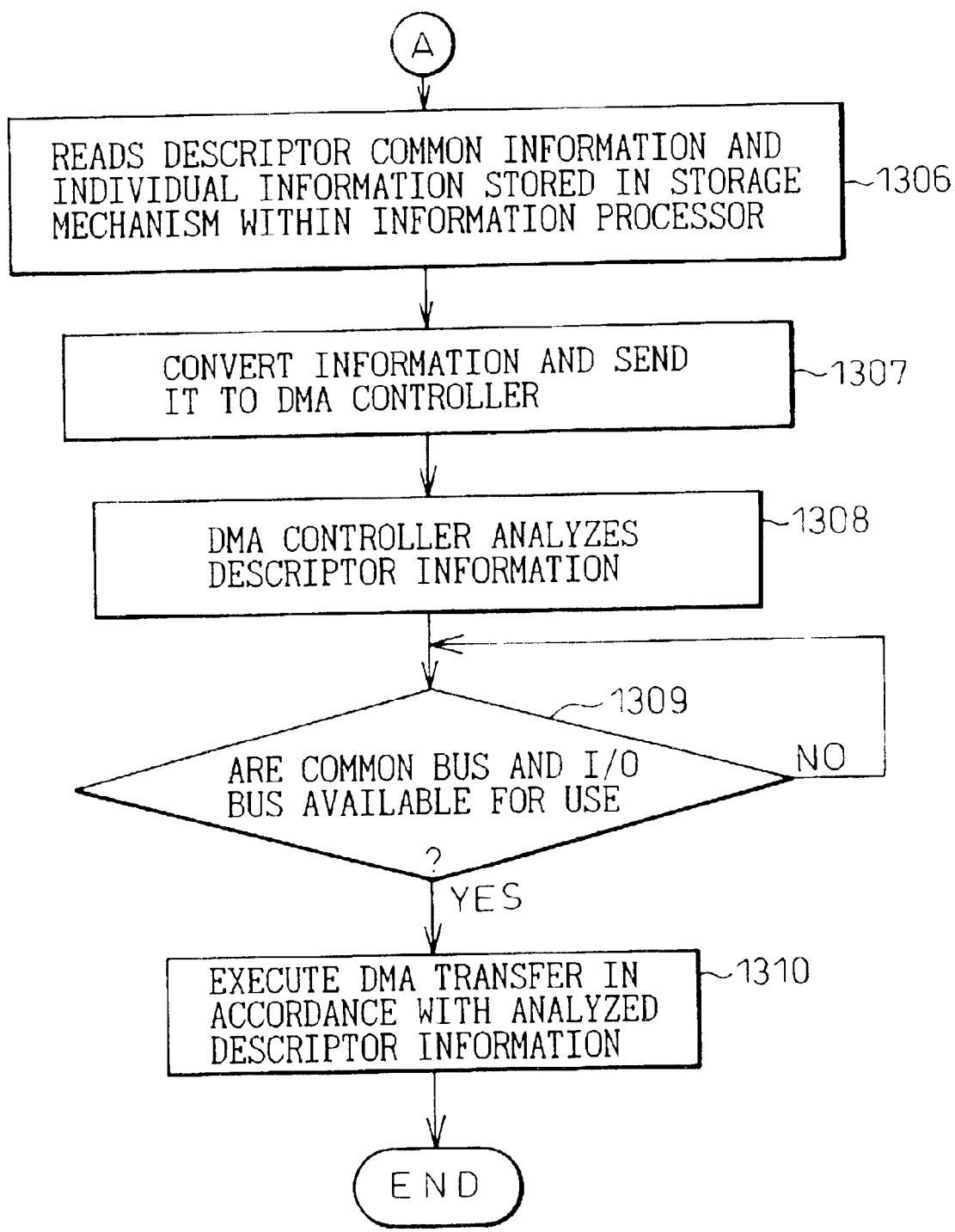

Fig. 15A

| 31 | 24 23 | 16 15 | 8 7 | 0 |
|---|---|---|---|---|
| | Head address | | Reserve | |

Fig. 15B

| 31 | | 24 23 | 16 15 | 8 7 | 0 |
|---|---|---|---|---|---|
| S | C | Byte count | | Offset | |

Fig. 16A

| 31 | 24 23 | 16 15 | 8 7 | 0 | |
|---|---|---|---|---|---|
| | Head address | | Reserve | | ← A |
| | Head address | | Reserve | | ← B |

Fig. 16B

| 31 | | 24 23 | 16 15 | 8 7 | 0 | |
|---|---|---|---|---|---|---|
| S | C | Byte count | | Offset | | ← 1 |
| S | C | Byte count | | Offset | | ← 2 |
| S | C | Byte count | | Offset | | ← 3 |
| S | C | Byte count | | Offset | | ← 4 |
| S | C | Byte count | | Offset | | ← 5 |

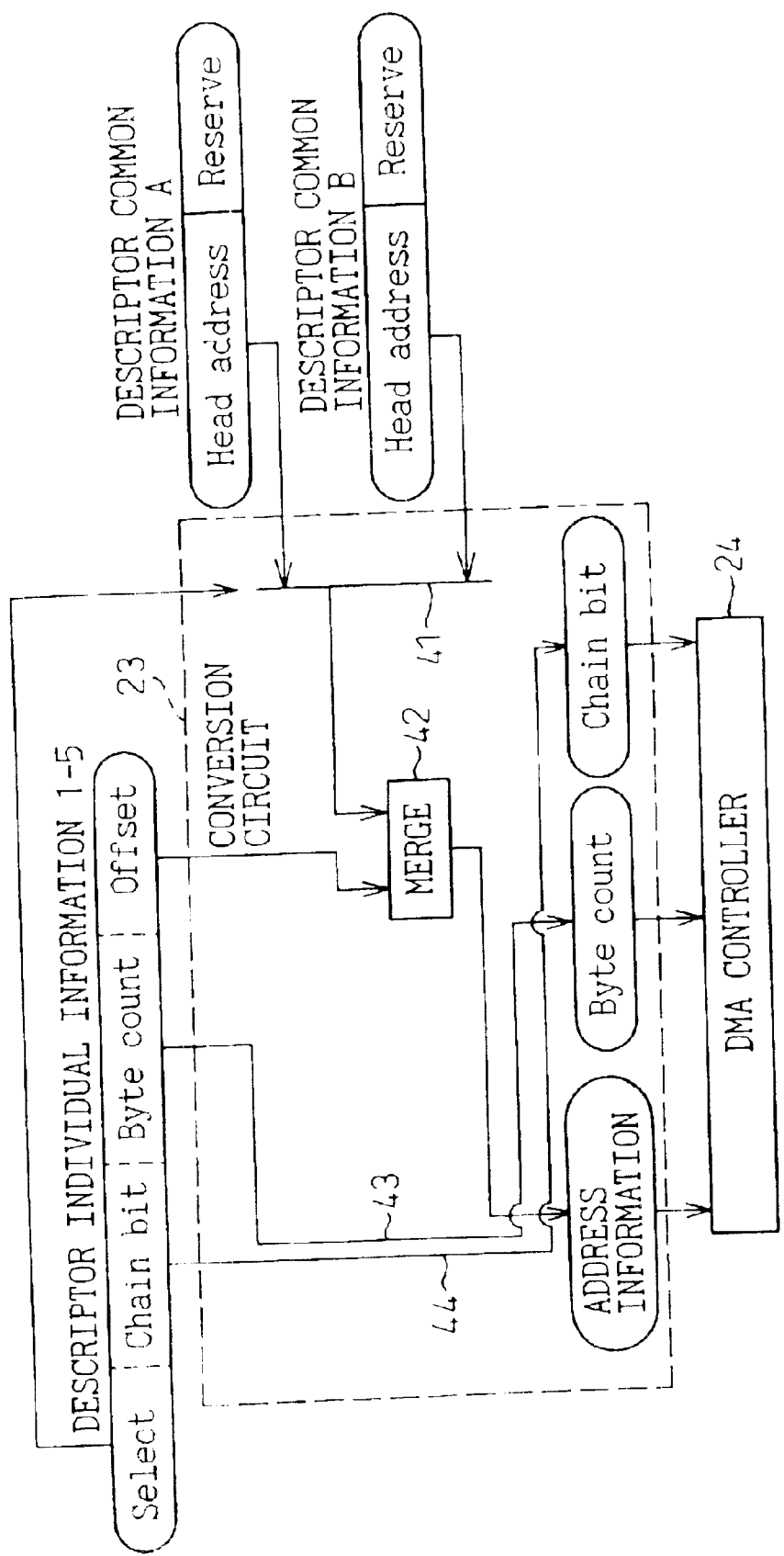

DESCRIPTOR STORAGE MECHANISM

DATA TRANSFER APPARATUS AND METHOD

BACKGROUND OF THE INVENTION

1. Field of the Invention

The present invention relates to a data transfer apparatus and method, and more particularly to a data transfer apparatus having a DMA (Direct Memory Access) controller, and a method for the same.

2. Description of the Related Art

In small computers, DMA transfer is employed which transfers data directly between an I/O device and a memory or between memories without the intervention of the CPU, and a DMA controller is used for such DMA transfer. Loaded with a memory address, transfer size, and other values, the DMA controller is activated to execute a DMA transfer.

In recent years, a method for controlling the DMA controller through descriptor control has been proposed in order to prevent system efficiency degradation which can occur when the host system controls data transfers in real time (refer, for example, to Japanese Unexamined Patent Publication No. 5-204829).

FIG. 20 is a format diagram showing one example of a descriptor format according to the prior art. In the example shown here, one address information (AD) and one byte count information (BC) are paired to form one descriptor information.

The address information (AD) indicates the starting point (address) of the DMA transfer data stored in a storage mechanism, and consists of 32 bits (bits 31 to 00). The byte count information (BC) indicates the amount of the DMA transfer data, and consists of 32 bits (bits 31 to 00) of which bits 31 to 14 are reserved bits and bits 13 to 00 are the actual byte count bits.

FIG. 21 is a schematic diagram showing one example of the structure of a descriptor storage mechanism for storing the descriptor shown in FIG. 20. The descriptor storage mechanism shown here can hold a plurality of descriptors (in the illustrated example, five descriptors indicated by i=1, 2, . . . , 5) each comprising address information ADi and byte count information BCi.

FIG. 22 is a diagram for explaining how the DMA controller fetches descriptor information according to the prior art. The DMA controller and the descriptor storage mechanism are connected via a common bus, and the DMA controller reads, via the common bus, the address information and the byte count stored in the descriptor storage mechanism. The DMA controller executes a DMA transfer based on the thus readout address information and byte count.

FIG. 23 is a format diagram showing another example of the descriptor format according to the prior art. In the example shown here, one address information (AD), one byte count information (BC), and one next descriptor address (ND) together constitute one descriptor information.

The difference from the example shown in FIG. 20 is that, in FIG. 23, bit 31 in the byte count information (BC) is used as a chain bit (C). This chain bit is a bit that indicates whether a plurality of DMA transfers are to be executed in succession, that is, a descriptor chain is to be executed; when this bit is ON, the next descriptor address is carried in the next area. The next descriptor address indicates the storage location of the descriptor information to be read next.

FIG. 24 is a schematic diagram showing one example of the structure of a descriptor storage mechanism for storing the descriptor show in FIG. 23. As shown, the descriptor storage mechanism can hold a plurality of descriptors (in the illustrated example, five descriptors indicated by i=1, 2, . . . , 5) each comprising address information ADi, byte count information BCi, and a next descriptor address NDi.

FIG. 25 is a diagram for explaining how the DMA controller fetches the descriptor information stored in the descriptor storage mechanism of FIG. 24. As shown in FIG. 25, when a descriptor chain is supported, the DMA controller executes a DMA transfer by fetching the next descriptor address in addition to the address information and the byte count.

Here, when the descriptor information is stored in its entirety in the descriptor storage mechanism as described above, if the storage areas, etc. for DMA control are large in size or in number, the amount of information carried in the descriptor becomes large, necessitating a corresponding increase in the size of the storage mechanism for storing the descriptor information, and hence resulting in an increase in the amount of hardware.

Furthermore, when the amount of information carried in the descriptor becomes large, as the number of transfers of the descriptor information increases, the number of times the common bus is used increases, making the common bus unavailable for other processing operations; this can result in a degradation of system performance.

On top of that, if a descriptor chain is to be executed, as the next descriptor address becomes necessary, the amount of information carried in the descriptor further increases, requiring an increase in the size of the storage mechanism for storing the descriptor information, and as a result, the amount of hardware further increases.

Furthermore, when the next descriptor address is added, the number of transfers of the descriptor information increases, increasing the number of times the common bus is used and thus making the common bus unavailable for other processing operations; this can result in a further degradation of system performance.

SUMMARY OF THE INVENTION

The present invention has been devised in view of the above problems, and an object of the invention is to provide a data transfer apparatus and method that can make efficient use of the memory and the common bus and can achieve increased communication processing speed.

To achieve the above object, according to one aspect of the present invention, there is provided a data transfer apparatus which executes a DMA transfer by controlling a DMA controller through the use of a descriptor, comprising: a first storage mechanism for storing descriptor common information that can be shared among a plurality of descriptors; a second storage mechanism for storing descriptor individual information that differs for each individual descriptor; and a conversion circuit for taking as inputs the descriptor common information read out of the first storage mechanism and the descriptor individual information read out of the second storage mechanism, and for outputting descriptor information to be supplied to the DMA controller.

Preferably, according to the invention, the first storage mechanism is capable of storing a plurality of sets of the descriptor common information.

Preferably, according to the invention, the descriptor individual information includes selection information for selecting one of the plurality of sets of the descriptor common information.

Preferably, according to the invention, the descriptor common information includes information concerning a high-order address part of an address at which a DMA transfer is to be started.

Preferably, according to the invention, the descriptor individual information includes information concerning a low-order address part of the address at which the DMA transfer is to be started.

Preferably, according to the invention, the conversion circuit selects one of the plurality of sets of the descriptor common information based on the input descriptor individual information, creates address information by combining the high-order address part in the selected descriptor common information with the low-order address part in the descriptor individual information, and supplies the address information to the DMA controller.

Preferably, according to the invention, the descriptor individual information includes information concerning a byte count indicating the amount of DMA transfer data.

Preferably, according to the invention, the descriptor individual information includes chain information indicating the presence or absence of a descriptor chain.

Preferably, according to the invention, the second storage mechanism has a FIFO structure for storing a plurality of sets of the descriptor individual information.

According to another aspect of the present invention, there is provided a data transfer method for causing a DMA controller to execute a DMA transfer by controlling the DMA controller through the use of a descriptor, comprising the steps of: (a) storing, in a first storage mechanism, descriptor common information that can be shared among a plurality of descriptors; (b) storing, in a second storage mechanism, descriptor individual information that differs for each individual descriptor; and (c) generating descriptor information to be supplied to the DMA controller, based on the descriptor common information read out of the first storage mechanism and on the descriptor individual information read out of the second storage mechanism.

With the above-described configuration, the necessary storage area, and hence the amount of hardware, can be reduced by separating the descriptor information into common information and individual information and storing them separately. Furthermore, as the descriptor common information need not be transferred each time a data transfer occurs, the amount of information to be transferred can be reduced, and bus usage thus decreases. As a result, the bus can be used for other processing operations, which serves to improve system performance.

Further, in the configuration supporting a descriptor chain, a chain bit indicating the presence or absence of a descriptor chain is provided in the descriptor information, and the storage mechanism for storing the descriptor information is constructed in a FIFO structure with provisions made to automatically select the next descriptor in the FIFO when the chain bit is ON; this configuration eliminates the need for the next descriptor address and serves to reduce the amount of information to be carried in the descriptor, and hence the size of the storage mechanism for storing the descriptor information can be reduced, achieving a reduction in the amount of hardware. Furthermore, as there is no need to transfer the next descriptor address, bus usage decreases, increasing the availability of the common bus for other processing operations, and system performance can thus be improved.

BRIEF DESCRIPTION OF THE DRAWINGS

Further features and advantages of the present invention will be apparent from the following description with reference to the accompanying drawings, in which:

FIG. 1 is a block diagram showing the functional configuration of a first embodiment of a LAN card to which the present invention is applied;

FIGS. 2A and 2B are format diagrams showing the formats of descriptor common information and descriptor individual information, respectively;

FIGS. 3A and 3B are block diagrams showing the structures of a first descriptor storage mechanism and a second descriptor storage mechanism, respectively;

FIG. 14 is a flowchart (2/2) illustrating the DMA transfer operation performed by the DMA processor according to the second embodiment;

FIGS. 15A and 15B are format diagrams showing the formats of the descriptor common information and descriptor individual information, respectively, according to a third embodiment;

FIGS. 16A and 16B are block diagrams showing the structures of the first descriptor storage mechanism and the second descriptor storage mechanism, respectively, according to the third embodiment;

FIG. 17 is a diagram showing the functional configuration of the descriptor conversion circuit according to the third embodiment;

DESCRIPTION OF THE PREFERRED EMBODIMENTS

Figure 4:
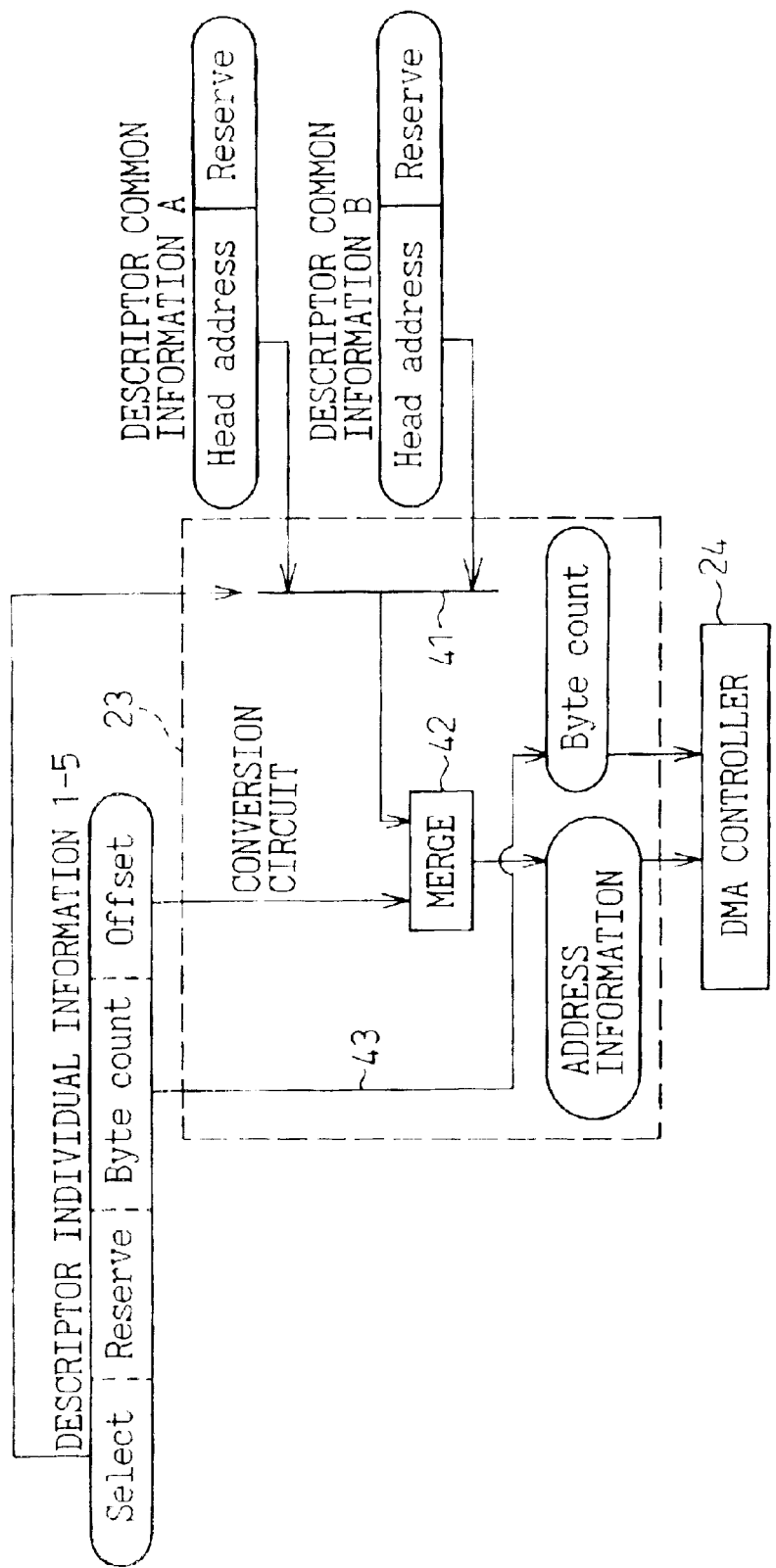
FIG. 4 is a block diagram showing the functional configuration of a descriptor conversion circuit.

The preferred embodiments of the present invention will be described in detail below with reference to the accompanying drawings.

Embodiment 1

FIG. 1 is a block diagram showing the functional configuration of one embodiment of a LAN card to which the present invention is applied. The LAN card is a communication control processing device which supports a connection to a LAN (Local Area Network). As shown, the LAN card proper 10 comprises an information processor 12, a DMA (Direct Memory Access) processor 13, and a PCI bus (Peripheral Component Interconnect Bus) interface 14 interconnected via a common bus 11.

The information processor 12 includes a control mechanism 18 and a storage mechanism 19. The storage mechanism 19 is a device (memory) for storing software, data, etc. and includes a DMA transfer data storage area 20. The control mechanism 18 is a device (CPU) for executing software instructions, and accomplishes the task of writing descriptor information to a first descriptor storage mechanism 21 and a second descriptor storage mechanism 22 within the DMA processor 13 and the task of writing DMA transfer data to the DMA transfer data storage area 20 within the storage mechanism 19.

The DMA processor 13 is a device incorporating a DMA controller 24, and comprises descriptor storage areas, i.e., the first descriptor storage mechanism 21 for storing common information and the second descriptor storage mechanism 22 for storing individual information, and a descriptor conversion circuit 23 for converting the descriptor common information and descriptor individual information and for passing the converted information to the DMA controller 24.

The PCI bus interface 14 is a device for connecting the internal common bus 11 via a PCI card edge 17 to a PCI bus in the host external to the LAN card proper.

The LAN card 10 further includes a MAC (Media Access Control) 15. The MAC 15 is connected to the DMA processor 13 via an I/O bus 25, and has functions for converting DMA transfer data into a prescribed frame format for transmission to the outside via a LAN interface 16, and for decoding data received in a given frame format via the LAN interface 16 and thereby determining whether the data is addressed to the LAN card 10.

FIGS. 2A and 2B are format diagrams showing the descriptor format according to the present embodiment. The descriptor information is made up of the descriptor common information shown in FIG. 2A and the descriptor individual information shown in FIG. 2B. That is, one common information and one individual information are paired to form one descriptor information.

The descriptor common information consists of 32 bits, and specifies/indicates the high-order two bytes (high-order address part) of the starting address in the transmission/reception of DMA transfer data. The alignment is done in units of 64 kbytes. Bits 31 to 16 form the high-order address area (Head address), and bits 15 to 00 are reserved bits.

The descriptor individual information consists of 32 bits, and specifies/indicates the starting address select code, byte count, and low-order address in the transmission/reception of DMA transfer data.

More specifically, bit 31 is a select bit (S); when the value of this bit is "0", the descriptor common information A to be described later is selected as the starting address, while when the value is "1", the descriptor common information B to be described later is selected as the starting address.

Bit 30 is a reserved bit (R), bits 29 to 16 form a byte count area, i.e., a byte-length area, and bits 15 to 00 form an offset area, i.e., the low-order address area.

FIGS. 3A and 3B are schematic diagrams showing the structures of the first descriptor storage mechanism 21 and the second descriptor storage mechanism 22, respectively, according to the present embodiment. As shown, the descriptor information is separated into the descriptor common information and the descriptor individual information and stored in the respective storage mechanisms, that is, the common information is stored in the first descriptor storage mechanism (FIG. 3A) and the individual information in the second descriptor storage mechanism (FIG. 3B); here, a plurality of sets of descriptor common information and a plurality of sets of descriptor individual information can be held in the respective storage mechanisms.

In FIGS. 3A and 3B, two sets of descriptor common information, designated A and B, are stored in the first descriptor storage mechanism 21, and five sets of descriptor individual information, indicated at 1 to 5, are stored in the second descriptor storage mechanism 22, but it will be appreciated that the present invention is not limited to these examples.

If the descriptor common information increases, for example, from two sets (A and B) to four sets (A, B, C, and D), the select area in the descriptor individual information will be expanded to the reserved bit 30 so that one set can be selected from among the four sets of descriptor common information.

FIG. 4 is a conceptual diagram showing the functional configuration of the descriptor conversion circuit 23 according to the present embodiment. The descriptor conversion circuit 23 includes a selector 41 for selecting the high-order two bits of the starting address, that is, the high-order address part (Head address) in either the descriptor common information A or the descriptor common information B stored in the first descriptor storage mechanism 21, whichever information is selected based on the value (Select) of the select area in the descriptor individual information.

The descriptor conversion circuit 23 further includes a circuit 42 for creating address information by combining (merging) the selected high-order address (the high-order two bits of the starting address) with the low-order address, that is, the offset in the descriptor individual information, and a circuit 43 for extracting the byte count from the descriptor individual information.

When descriptor individual information is input to the second descriptor storage mechanism 22, the descriptor conversion circuit 23 performs a descriptor information conversion. That is, the descriptor conversion circuit 23 selects the head address, that is, the high-order address, in the descriptor common information selected based on the value (Select) of the select area in the input descriptor individual information, and creates address information by combining the high-order address with the low-order address, i.e., the offset in the descriptor individual information, while also creating byte count information by extracting the byte count from the descriptor individual information. The thus created address information and byte count information are sent to the DMA controller 24.

Figure 5:
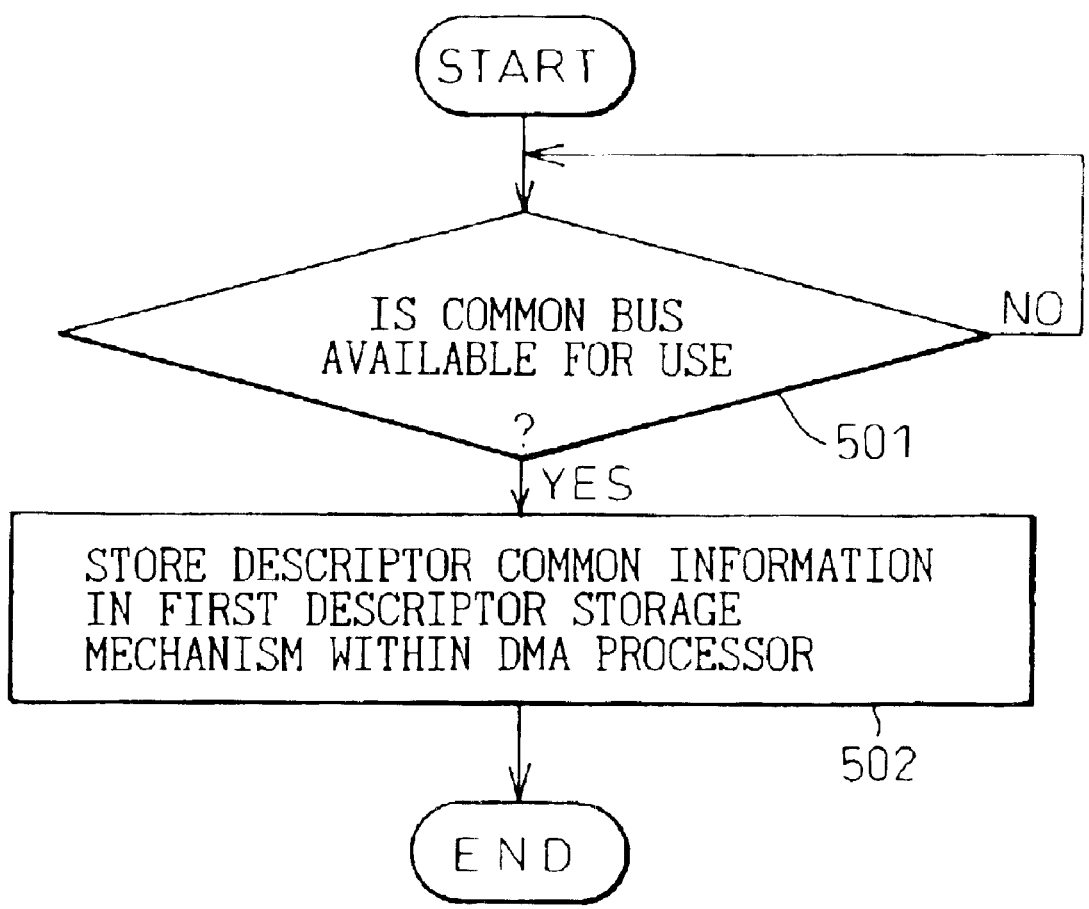
FIG. 5 is a flowchart illustrating the descriptor common information transfer operation performed by a control mechanism.
Figure 6:
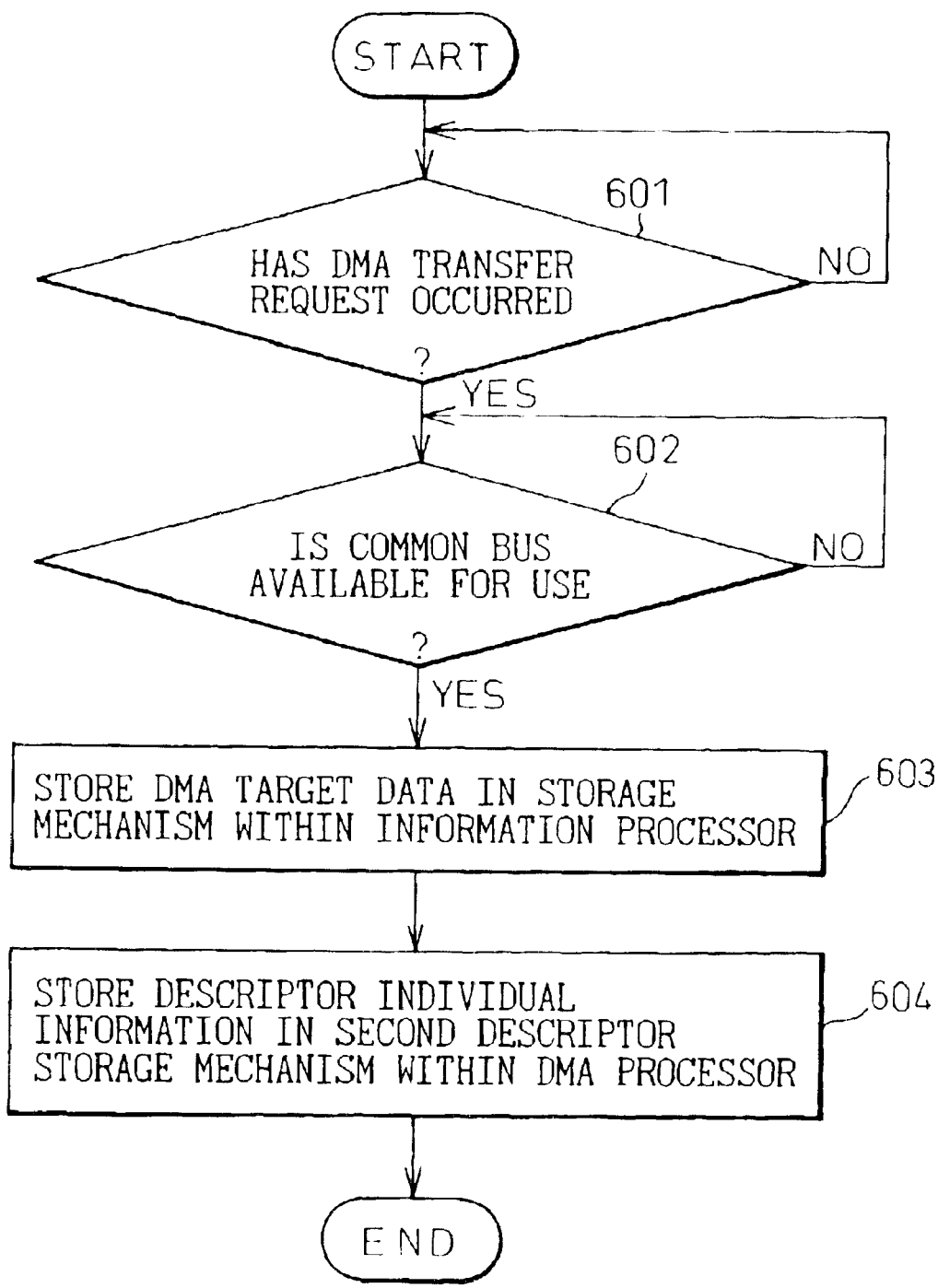
FIG. 6 is a flowchart illustrating the descriptor individual information transfer operation performed by the control mechanism.
Figure 7:
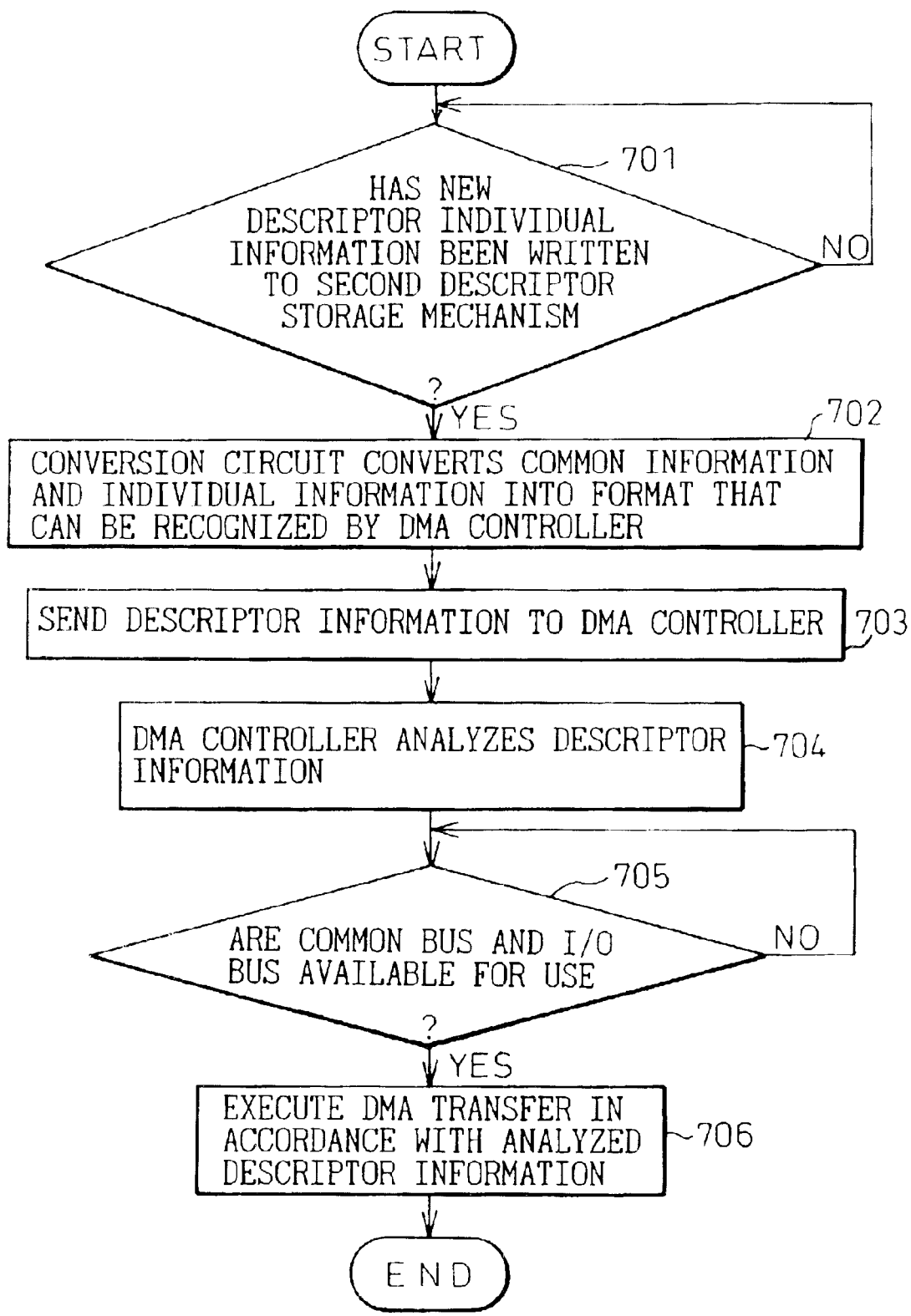
FIG. 7 is a flowchart illustrating the DMA transfer operation performed by a DMA processor.

Operation of the LAN card having the above configuration according to the present embodiment will be described with reference to FIG. 1 and FIGS. 5 to 7. FIGS. 5 to 7 are flowcharts illustrating the major operations of the LAN card according to the present embodiment: FIG. 5 is a flowchart illustrating the descriptor common information transfer operation performed by the control mechanism 18, FIG. 6 is a flowchart illustrating the descriptor individual information transfer operation performed by the control mechanism 18, and FIG. 7 is a flowchart illustrating the DMA transfer operation performed by the DMA processor 13.

First, in FIG. 5, the control mechanism 18 checks whether the common bus 11 is available for use (step 501); if the common bus 11 is available, the process proceeds to step 502, but if the common bus 11 is not available, the process waits for a predetermined length of time until the common bus 11 becomes available.

When the common bus 11 is available, the control mechanism 18 stores the descriptor common information in the first descriptor storage mechanism 21 within the DMA processor 13 via the common bus 11 (step 502), and proceeds to another process after storing the descriptor common information.

Next, in FIG. 6, when a DMA transfer request occurs (step 601), the control mechanism 18 checks whether the common bus 11 is available for use (step 602); if the common bus 11 is available, the process proceeds to step 603, but if the common bus 11 is not available, the process waits for a predetermined length of time until the common bus 11 becomes available.

When the common bus 11 is available, the control mechanism 18 in step 603 stores the DMA target data in the DMA transfer data storage area 20 within the storage mechanism 19 in the information processor 12, and thereafter proceeds to step 604. Then, the control mechanism 18 stores the descriptor individual information in the second descriptor storage mechanism 22 within the DMA processor 13 (step 604), and proceeds to another process after storing the descriptor individual information.

On the other hand, in FIG. 7, the DMA processor 13 is constantly checking whether any descriptor individual information has been written to the second descriptor storage mechanism 22 (step 701), and when new descriptor individual information is written, the process proceeds to step 702.

Then, the descriptor conversion circuit 23 reads the thus written descriptor individual information and the already stored descriptor common information and converts the information into the address information and the byte count in the format that can be recognized by the DMA controller 24 (step 702), and then sends the thus converted descriptor information (address information and byte count) to the DMA controller 24 (step 703).

Next, the DMA controller 24 analyzes the converted descriptor information (address information and byte count) (step 704). Then, the DMA controller 24 checks whether the common bus 11 and the I/O bus 25 are available for use (step 705); if the common bus 11 and the I/O bus 25 are available, the process proceeds to step 706, but if they are not available, the process waits for a predetermined length of time until the common bus 11 and the I/O bus 25 become available.

When the common bus 11 and the I/O bus 25 are available, the DMA controller 24 identifies the DMA target data within the storage mechanism 19, and executes the DMA transfer by using the common bus 11 and the I/O bus 25 in accordance with the analyzed descriptor information (step 706). When the transfer is completed, the DMA processor 13 waits until the next descriptor individual information is written.

Figure 8:
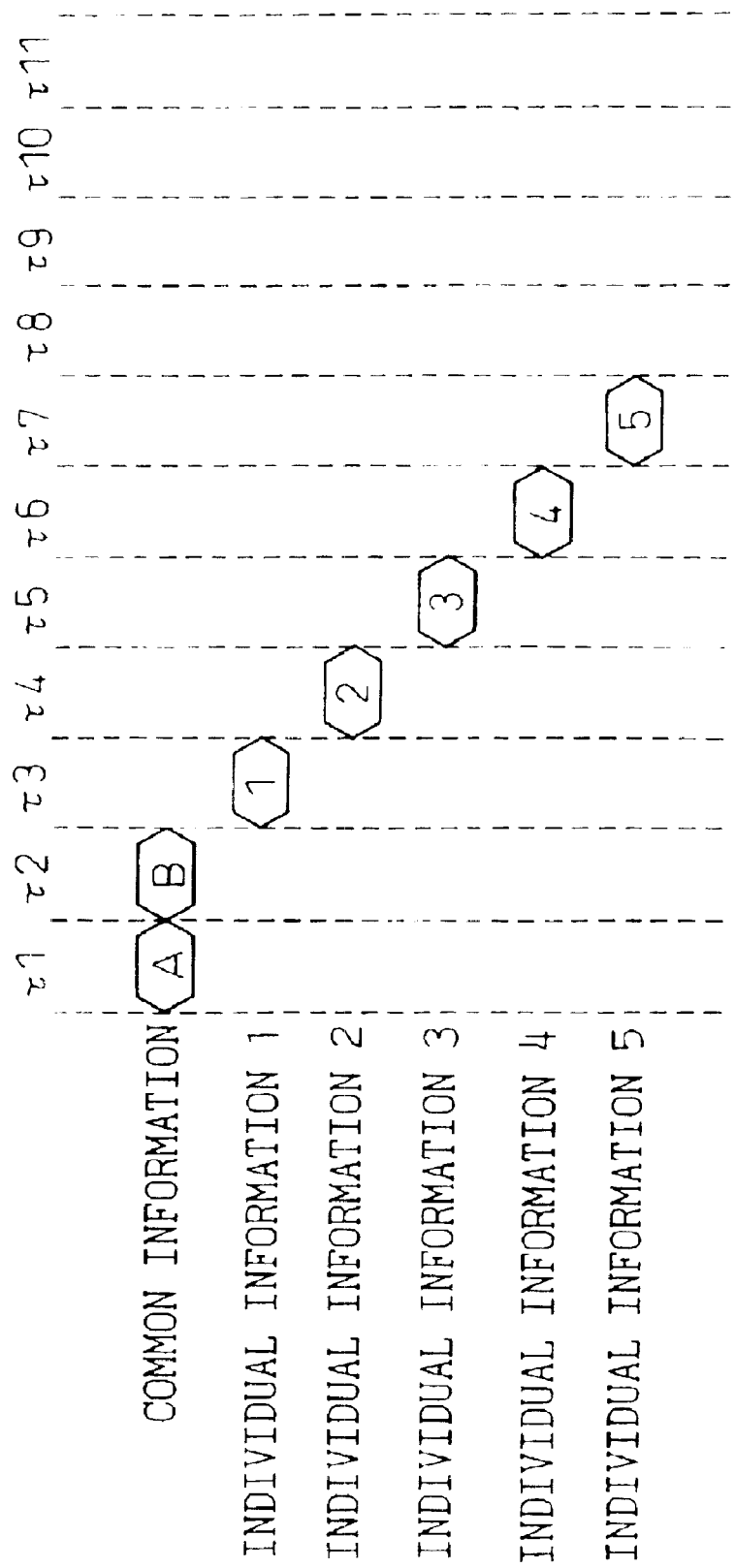
FIG. 8 is a timing chart showing the transfer timing of the descriptor information according to the first embodiment.

FIG. 8 is a timing chart showing the transfer timing of the descriptor information according to the present embodiment. In the figure, "A" and "B" designate the descriptor common information A and the descriptor common information B, respectively, and "1" to "5" indicate the respective descriptor individual information 1 to 5. In the DMA transfer of the present embodiment, when sending the descriptor information to the DMA processor 13, first the descriptor common information is sent, and thereafter, when a DMA transfer becomes necessary, only the descriptor individual information is sent.

In the example of FIG. 8, the descriptor common information A and the descriptor common information B are sent on cycles $\tau 1$ and $\tau 2$, respectively, after which the descriptor individual information 1 is sent on cycle $\tau 3$, the descriptor individual information 2 is sent on cycle $\tau 4$, the descriptor individual information 3 is sent on cycle $\tau 5$, the descriptor individual information 4 is sent on cycle $\tau 6$, and the descriptor individual information 5 is sent on cycle $\tau 7$, respectively. However, the way of sending the descriptor individual information is not limited to this example; in practice, the information is sent as required in accordance with a DMA transfer request.

Figure 9:
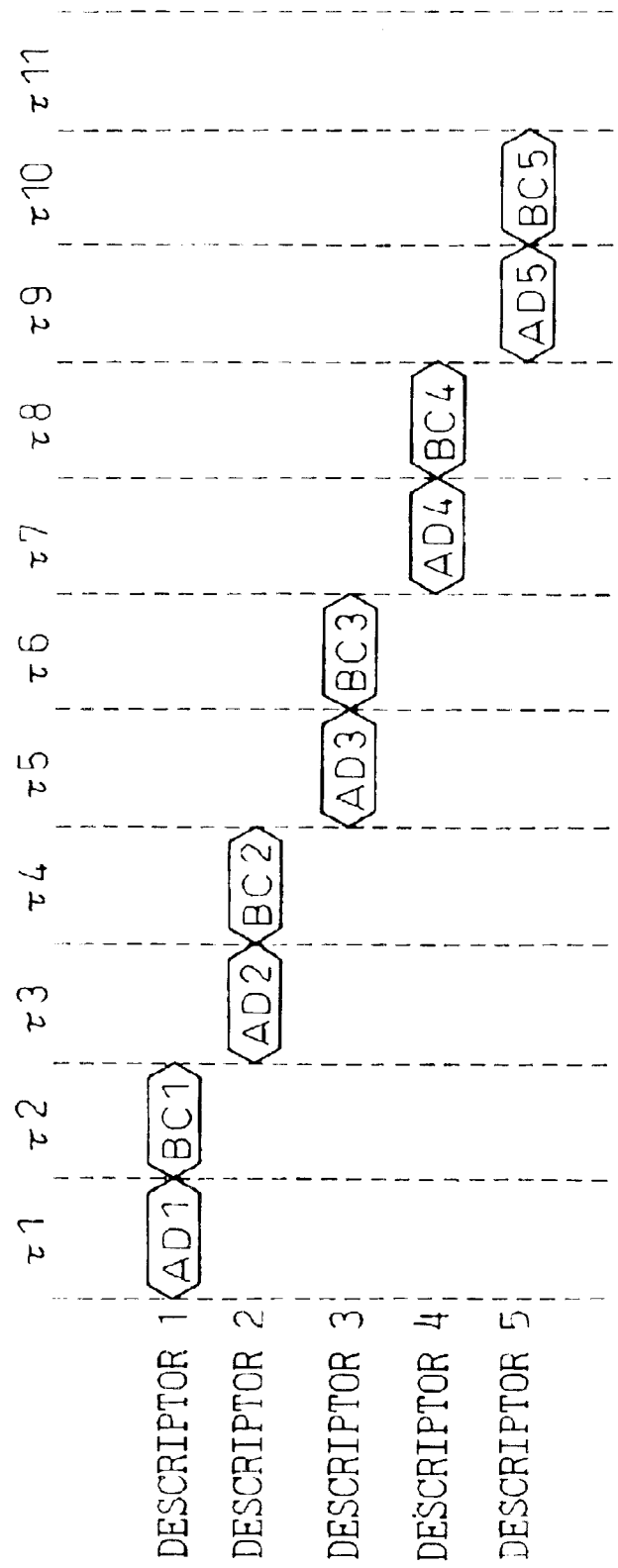
FIG. 9 is a timing chart showing the transfer timing of the descriptor information according to the prior art.

On the other hand, FIG. 9 is a timing chart showing the transfer timing of the descriptor information according to the prior art. In the figure, "AD1" to "AD5" indicate the address information in the respective descriptor information, and "BC1" to "BC5" indicate the byte count information in the respective descriptor information.

In the DMA transfer of the prior art, when sending the descriptor information to the DMA processor, the address information and byte count information carried in each descriptor information are sent in series. That is, the address information in the descriptor information 1 is sent on cycle $\tau 1$, and the byte count information in the descriptor 1 is sent on cycle $\tau 2$.

Likewise, the address information in the descriptor 2 is sent on cycle $\tau 3$ and the byte count information in the descriptor 2 is sent on cycle $\tau 4$; the address information in the descriptor 3 is sent on cycle $\tau 5$ and the byte count information in the descriptor 3 is sent on cycle $\tau 6$; the address information in the descriptor 4 is sent on cycle $\tau 7$ and the byte count information in the descriptor 4 is sent on cycle $\tau 8$; and the address information in the descriptor 5 is sent on cycle $\tau 9$ and the byte count information in the descriptor 5 is sent on cycle $\tau 10$.

In the DMA transfer of the prior art, the time required to transfer the information of all the descriptors 1 to 5 is the sum of $\tau 1$ to $\tau 10$; in contrast, in the present embodiment, the time required to transfer the information of all the descriptors 1 to 5 is the sum of $\tau 1$ to $\tau 7$, achieving a reduction in the time the common bus is occupied, and hence an improvement compared with the prior art.

In this way, according to the present embodiment, by extracting the common information from the descriptor information and storing it separately, the amount of hardware can be reduced. Furthermore, as the amount of information to be transferred on the common bus is reduced, common bus usage for the information transfer decreases, increasing the availability of the common bus for other processing operations, and a performance improvement can thus be expected.

Figure 10:
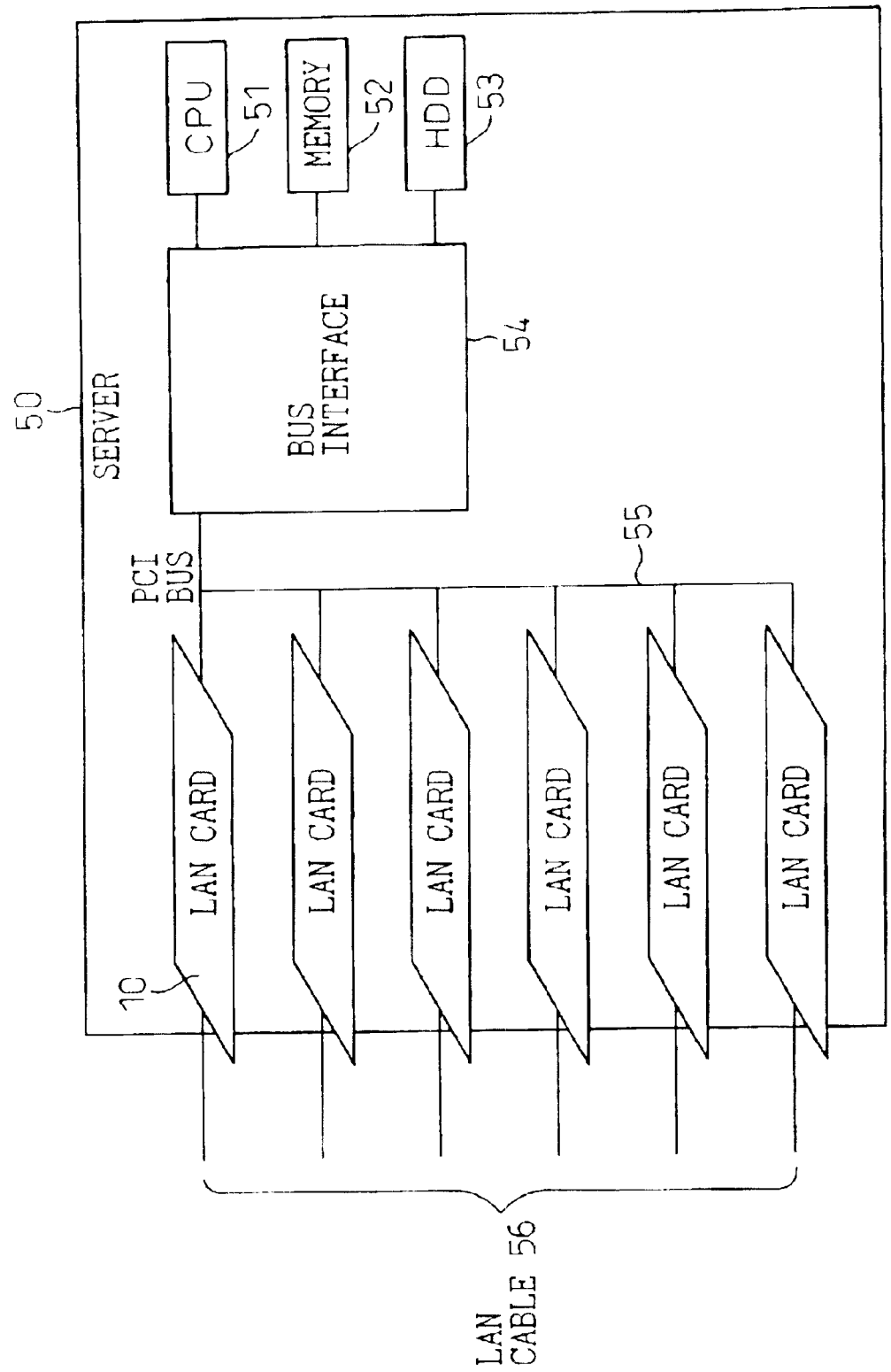
FIG. 10 is a block diagram showing the configuration of one embodiment of a server equipped with LAN cards to which the present invention is applied.

FIG. 10 is a block diagram showing the configuration of one embodiment of a server equipped with LAN cards to which the present invention is applied. In the figure, the server main unit 50 comprises a CPU 51, a memory 52, a hard disk drive (HDD) 53, a bus interface 54, and a plurality of LAN cards 10; here, the CPU 51, the memory 52, and the HDD 53 are interconnected via the bus interface 54. Each LAN card 10 is connected to the bus interface 54 via a PCI bus 55; the LAN card can also be connected to an external LAN via a LAN cable 56.

Embodiment 2

Figure 11:
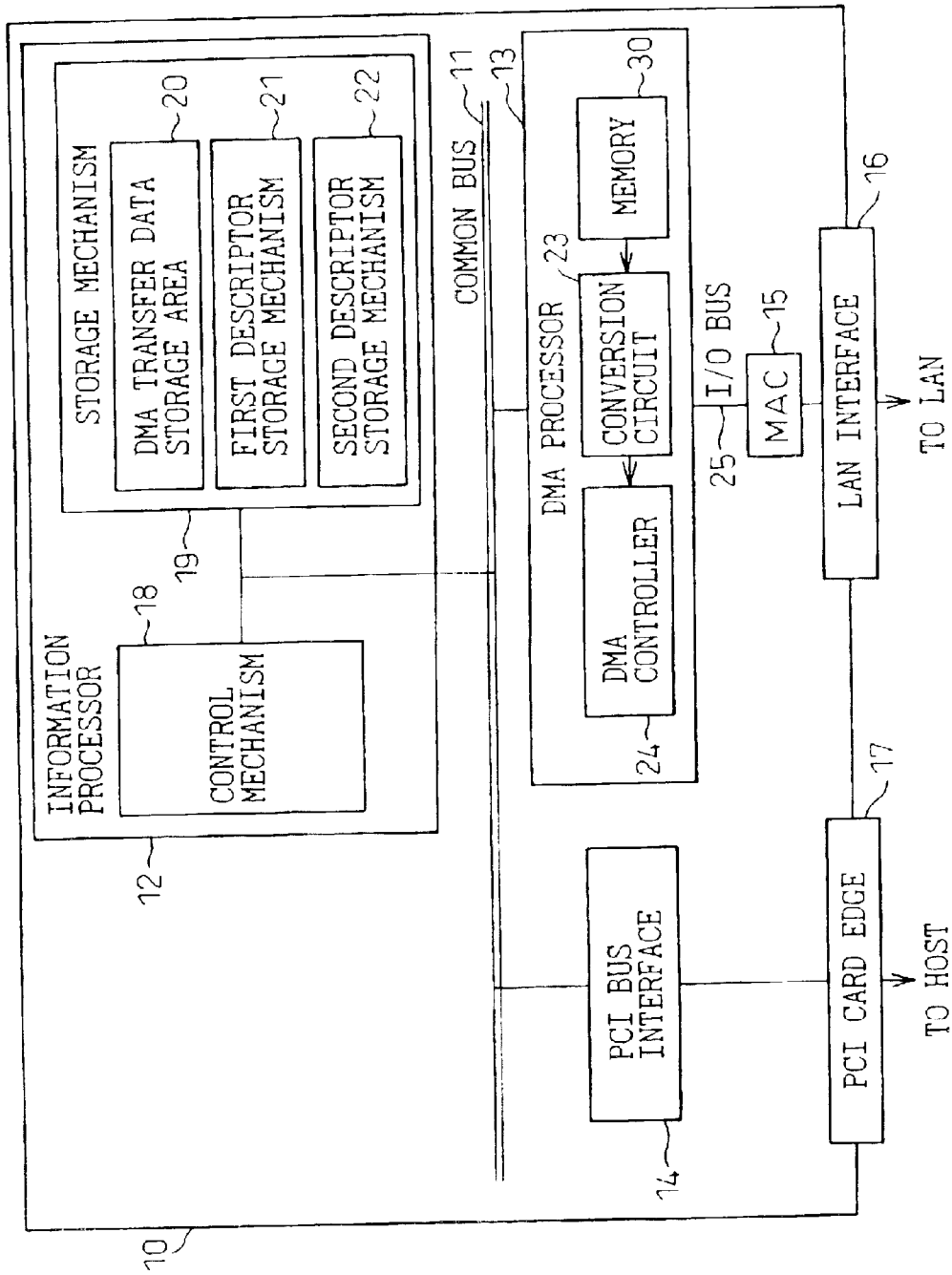
FIG. 11 is a block diagram showing the functional configuration of a second embodiment of a LAN card to which the present invention is applied.

FIG. 11 is a block diagram showing the functional configuration of another embodiment of a LAN card to which the present invention is applied. The LAN card proper 10 shown here comprises an information processor 12, a DMA (Direct Memory Access) processor 13, and a PCI bus (Peripheral Component Interconnect Bus) interface 14 interconnected via a common bus 11.

The information processor 12 includes a control mechanism 18 and a storage mechanism 19. The storage mechanism 19 is a device (memory) for storing software, data, etc. and includes a DMA transfer data storage area 20, a first descriptor storage mechanism 21, and a second descriptor storage mechanism 22. The control mechanism 18 is a device (CPU) for executing software instructions, and accomplishes the task of writing descriptor information to the first descriptor storage mechanism 21 and the second descriptor storage mechanism 22 within the storage mechanism 19 and the task of writing DMA transfer data to the DMA transfer data storage area 20 within the storage mechanism 19.

The DMA processor 13 is a device incorporating a DMA controller 24, and comprises a memory 30 for holding therein the received descriptor information, and a descriptor conversion circuit 23 for converting descriptor common information and descriptor individual information and for passing the converted information to the DMA controller 24.

The PCI bus interface 14 is a device for connecting the internal common bus 11 via a PCI card edge 17 to a PCI bus in the host external to the LAN card proper.

The LAN card 10 further includes a MAC (Media Access Control) 15. The MAC 15 is connected to the DMA processor 13 via an I/O bus 25, and has functions for converting DMA transfer data into a prescribed frame format for transmission to the outside via a LAN interface 16, and for decoding data received in a given frame format via the LAN interface 16 and thereby determining whether the data is one addressed to the LAN card 10.

In the present embodiment, the descriptor format is the same as that described in the first embodiment with reference to FIGS. 2A and 2B, the structures of the first and second descriptor storage mechanisms are the same as those shown in FIGS. 3A and 3B, and the functional configuration of the descriptor conversion circuit 23 is the same as that shown in FIG. 4; therefore, these will not be described here.

Figure 12:
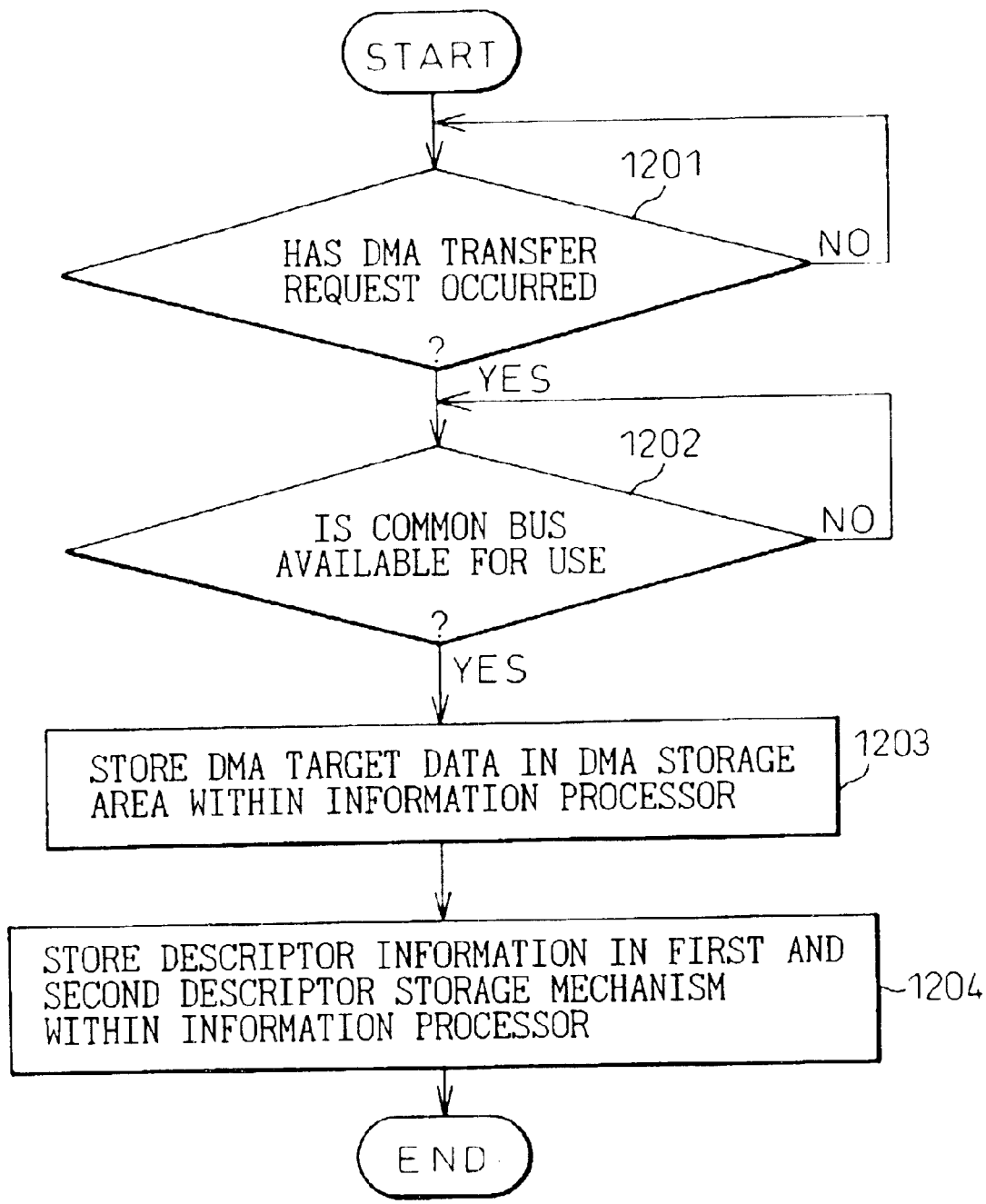
FIG. 12 is a flowchart illustrating the descriptor information transfer operation performed by the control mechanism according to the second embodiment.
Figure 13:
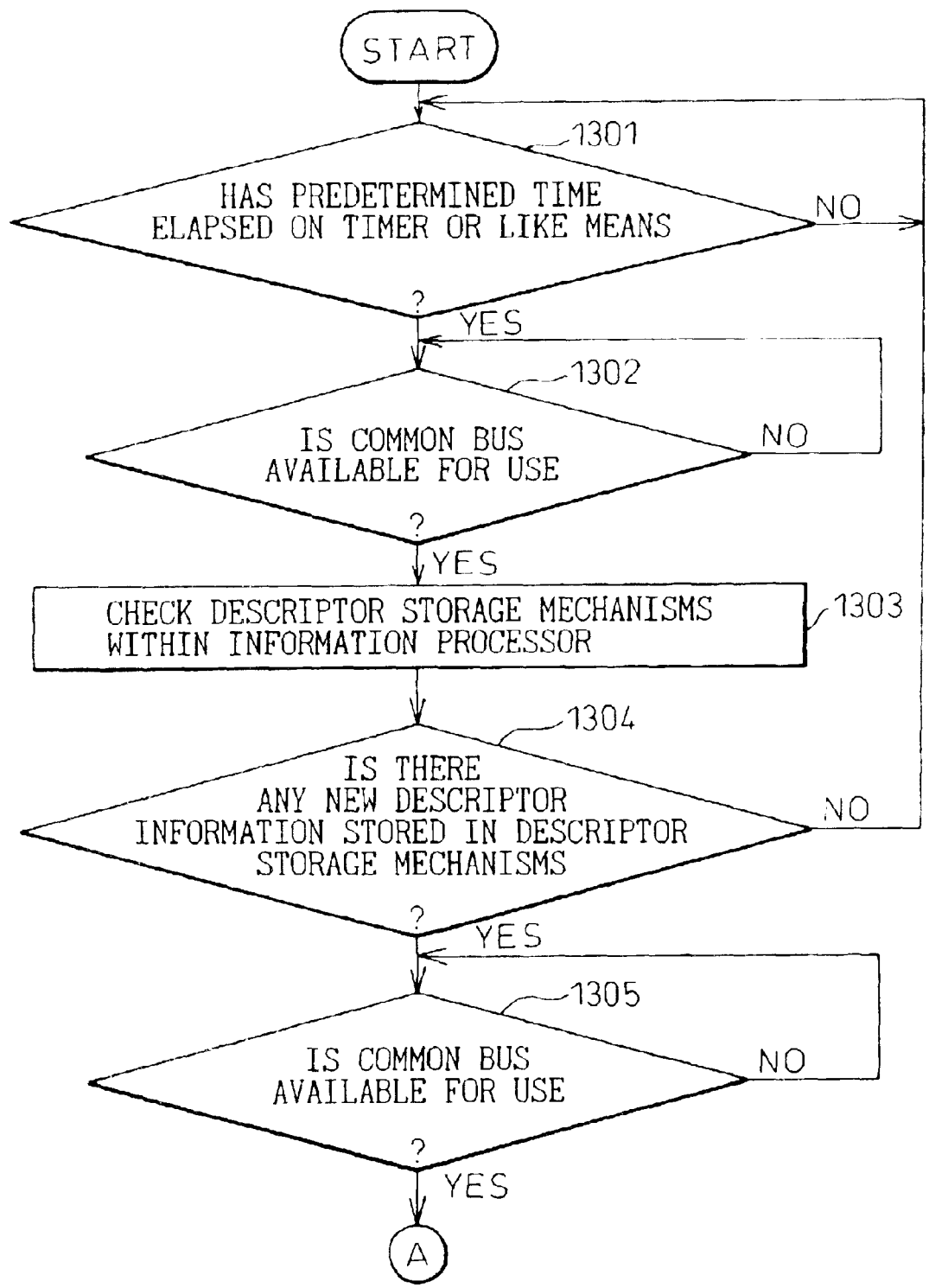
FIG. 13 is a flowchart (1/2) illustrating the DMA transfer operation performed by the DMA processor according to the second embodiment.

Operation of the LAN card having the above configuration according to the present embodiment will be described with reference to FIG. 11 and FIGS. 12 to 14. FIGS. 12 to 14 are flowcharts illustrating the major operations of the LAN card according to the present embodiment: FIG. 12 is a flowchart illustrating the descriptor information transfer operation performed by the control mechanism 18, and FIGS. 13 and 14 are flowcharts illustrating the DMA transfer operation performed by the DMA processor 13.

First, in FIG. 12, when a DMA transfer request occurs (step 1201), the control mechanism 18 checks whether the common bus 11 is available for use (step 1202); if the common bus is available, the process proceeds to step 1203, but if the common bus is not available, the process waits for a predetermined length of time until the common bus 11 becomes available.

When the common bus 11 is available, the control mechanism 18 stores the DMA target data in the DMA transfer data storage area 20 within the storage mechanism 19 in the information processor 12 (step 1203), and proceeds to the next step 1204. In step 1204, the control mechanism 18 stores the descriptor common information and the descriptor individual information in the first and second descriptor storage mechanisms 21 and 22, respectively, and proceeds to another process after storing the descriptor information. Here, if the descriptor common information is already stored in the first descriptor storage mechanism 21, only the descriptor individual information is stored in the above step.

On the other hand, in FIG. 13, the DMA processor 13 is constantly checking a timer or like means to determine whether a predetermined time has elapsed or not (step 1301), and each time the predetermined time elapses, the process proceeds to step 1302 to check whether the common bus 11 is available for use; if the common bus 11 is available, the process proceeds to step 1303, but if the common bus 11 is not available, the process waits for a predetermined length of time until the common bus 11 becomes available.

When the common bus 11 is available, the DMA processor 13 reads the first and second descriptor storage mechanisms 21 and 22 in the information processor 12 (step 1303) to check whether there is any new descriptor information stored in the descriptor storage mechanisms (step 1304); if there is newly stored descriptor information, the process proceeds to step 1305, but if there is no newly stored descriptor information, the process returns to step 1301.

When there is newly stored descriptor information stored, it is checked whether the common bus 11 is available for use (step 1305); if the common bus 11 is available, the process proceeds to step 1306, but if the common bus 11 is not available, the process waits for a predetermined length of time until the common bus 11 becomes available.

Then, in step 1306 of FIG. 14, the descriptor common information and the descriptor individual information are read into the memory 30 from the descriptor storage mechanisms 21 and 22. The descriptor conversion circuit 23 converts the descriptor common information and descriptor individual information into the address information and the byte count in the format that can be recognized by the DMA controller 24, and sends the thus converted information to the DMA controller 24 (step 1307).

Here, if provisions are made so that the descriptor common information once read out of the first descriptor storage mechanism 21 in the information processor 12 is stored and held in the memory 30 in the DMA processor 13, the descriptor common information need be read out only that once, and there is no need to read out the common information after that. This serves to reduce the time the common bus is occupied.

Next, the DMA controller 24 analyzes the converted descriptor information (address information and byte count)

(step 1308), and checks whether the common bus 11 and the I/O bus 25 are available for use (step 1309); if the common bus 11 and the I/O bus 25 are available, the process proceeds to step 1310, but if they are not available, the process waits for a predetermined length of time until the common bus 11 and the I/O bus 25 become available.

When the common bus 11 and the I/O bus 25 are available, the DMA controller 24 identifies the DMA target data within the storage mechanism 19, and executes the DMA transfer by using the common bus 11 and the I/O bus 25 in accordance with the analyzed descriptor information (step 1310). When the transfer is completed, the DMA processor 13 waits until the next descriptor is written.

In the foregoing first embodiment, the first descriptor storage mechanism 21 for storing the descriptor common information and the second descriptor storage mechanism 22 for storing the descriptor individual information are both provided within the DMA processor 13, while in the second embodiment, the first descriptor storage mechanism 21 and the second descriptor storage mechanism 22 are both provided within the information processor 12; alternatively, the first descriptor storage mechanism 21 for storing the descriptor common information may be provided within the DMA processor 13, and the second descriptor storage mechanism 22 for storing the descriptor individual information may be provided within the information processor 12.

Embodiment 3

Lastly, a third embodiment of a LAN card according to the present invention will be described. The basic configuration of the third embodiment is the same as that of the first embodiment shown in FIG. 1, except that modifications are made to the first embodiment to support a descriptor chain.

FIGS. 15A and 15B are format diagrams showing the formats of the descriptor common information and descriptor individual information, respectively, according to the present embodiment. As can be seen from a comparison with FIGS. 2A and 2B relating to the earlier described first embodiment, the descriptor common information (FIG. 15A) in the present embodiment is the same as that (FIG. 2A) in the first embodiment.

On the other hand, the descriptor individual information (FIG. 15B) in the present embodiment somewhat differs from that (FIG. 2B) in the first embodiment, in that bit 30 is used as a chain bit (C). This chain bit (C) is a bit that indicates whether a plurality of DMA transfers are to be executed in succession, that is, a descriptor chain is to be executed.

FIGS. 16A and 16B are schematic diagrams showing the structures of the first descriptor storage mechanism 21 and the second descriptor storage mechanism 22, respectively, according to the present embodiment. As can be seen from a comparison with FIGS. 3A and 3B relating to the earlier described first embodiment, the first descriptor storage mechanism 21 (FIG. 16A) in the present embodiment is the same as that (FIG. 3A) in the first embodiment.

On the other hand, the second descriptor storage mechanism 22 (FIG. 16B) in the present embodiment somewhat differs from that (FIG. 3B) in the first embodiment, in that bit 30 is used as a chain bit (C). Further, in the present embodiment, the second descriptor storage mechanism 22 (FIG. 16B) employs a FIFO (First In First Out) structure.

FIG. 17 is a diagram showing the functional configuration of the descriptor conversion circuit 23 according to the present embodiment. As can be seen from a comparison with FIG. 4, the descriptor conversion circuit of the present embodiment differs from the descriptor conversion circuit of the first embodiment by the inclusion of a circuit 44 for extracting the chain bit from the descriptor individual information.

Next, the operation of the LAN card of the third embodiment that supports a descriptor chain will be described. The descriptor common information transfer operation performed by the control mechanism 18 is the same as that shown in the flowchart of FIG. 5 relating to the earlier described first embodiment, and the descriptor individual information transfer operation performed by the control mechanism 18 is also the same as that shown in the flowchart of FIG. 6 relating to the earlier described first embodiment.

Figure 18:
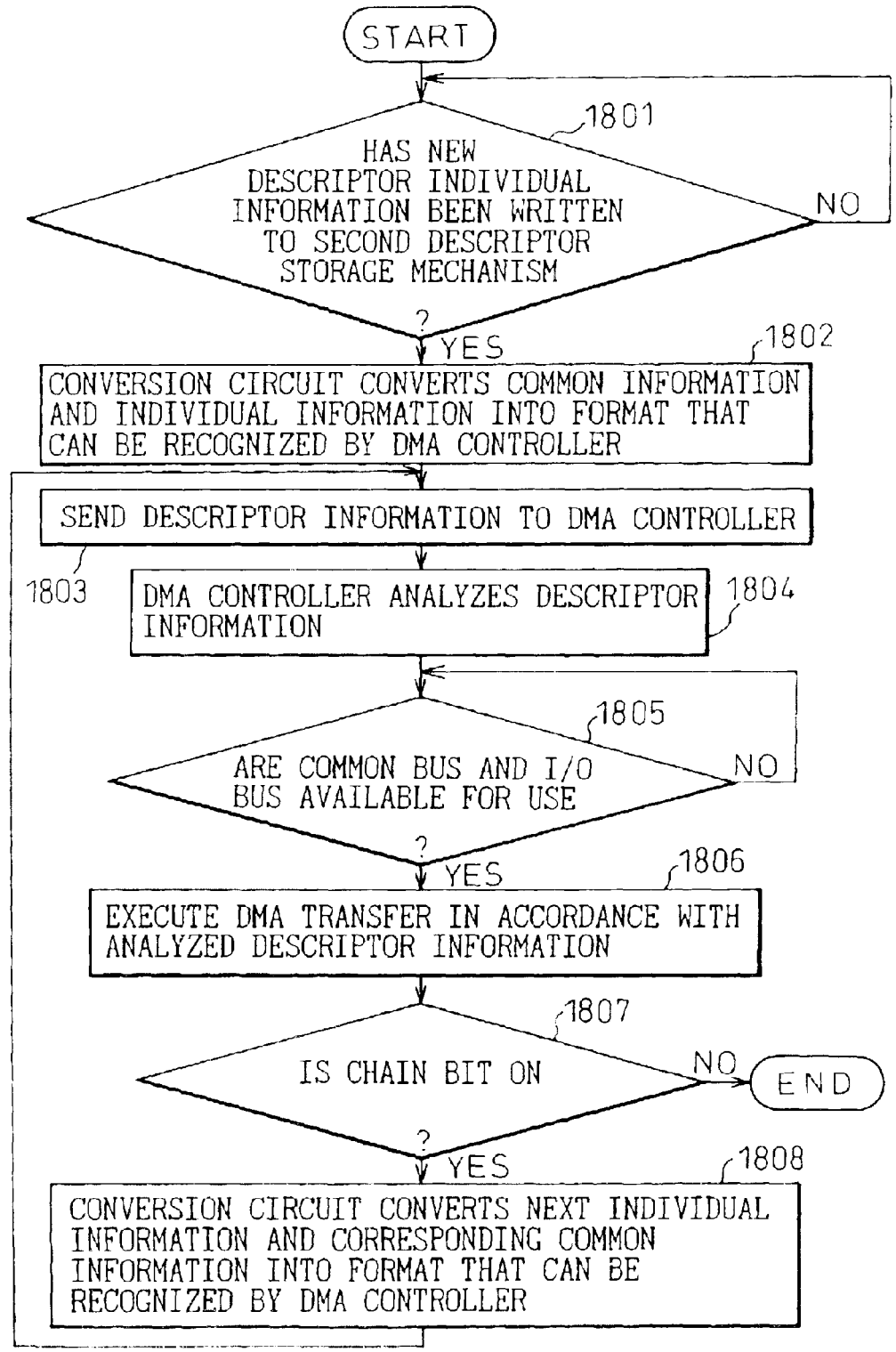
FIG. 18 is a flowchart illustrating the DMA transfer operation performed by the DMA processor according to the third embodiment.

On the other hand, the DMA transfer operation performed by the DMA processor 13 will be as shown in the flowchart of FIG. 18. As can be seen from a comparison between the flowchart of FIG. 18 and the flowchart of FIG. 7 relating to the earlier described first embodiment, steps 1801 to 1806 in FIG. 18 are the same as the corresponding steps 701 to 706 in FIG. 7, but in FIG. 18, new steps 1807 and 1808 are added.

In step 1807, it is determined whether the chain bit is ON or not; if the chain bit is not ON, that is, if it is OFF, the process is terminated. On the other hand, if the chain bit is ON, the process proceeds to step 1808. In step 1808, the descriptor conversion circuit 23 reads the next descriptor individual information in the FIFO structure, selects the corresponding descriptor common information, and creates the address information and byte count in the format that can be recognized by the DMA controller 24. After that, the process returns to step 1803.

In this way, in the descriptor chain according to the present embodiment, as the descriptor individual information storage mechanism is constructed in a FIFO structure and is configured to automatically select the next descriptor in the FIFO when the chain bit is ON, the next descriptor address is not needed. As a result, the amount of information to be carried in the descriptor decreases, and the size of the storage mechanism for storing the descriptor information decreases accordingly, thus achieving a reduction in the amount of hardware.

Figure 24:
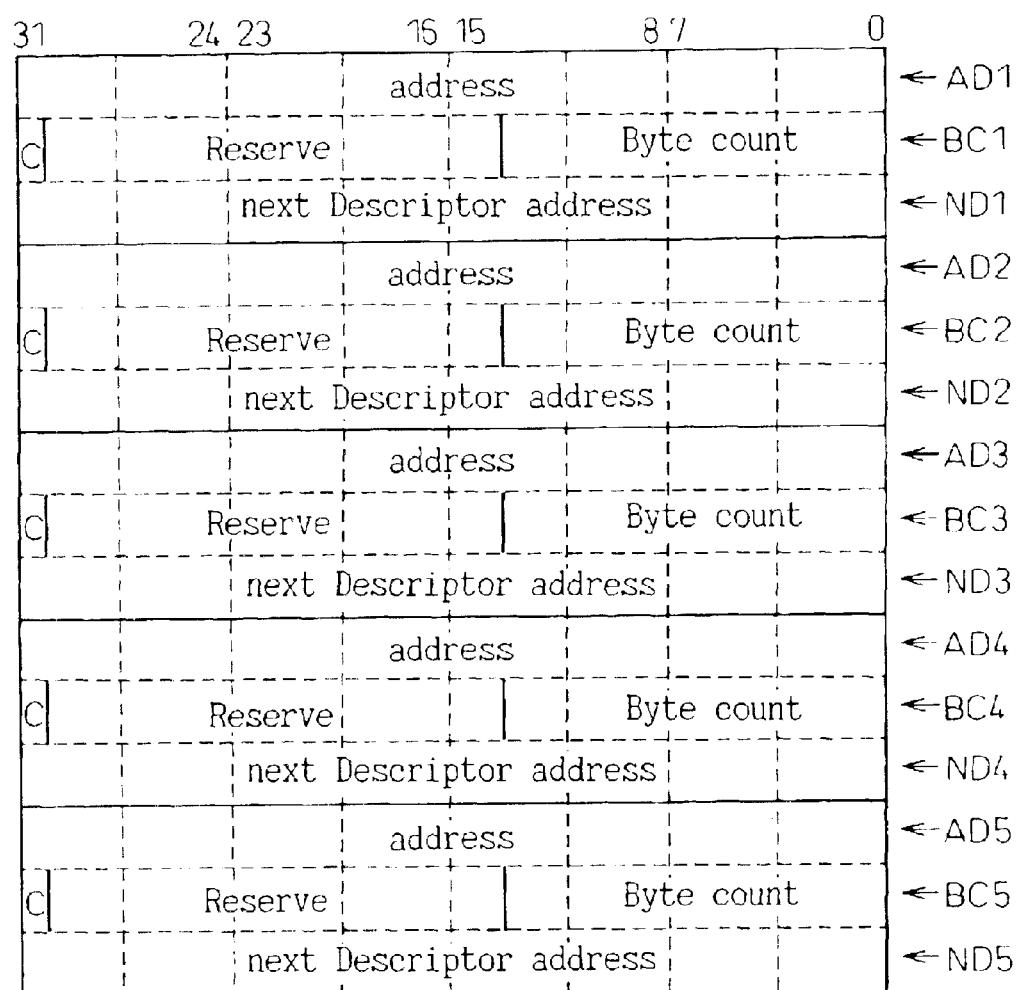
FIG. 24 is a schematic diagram showing one example of the structure of a descriptor storage mechanism for storing the descriptor show in FIG. 23.
Figure 25:
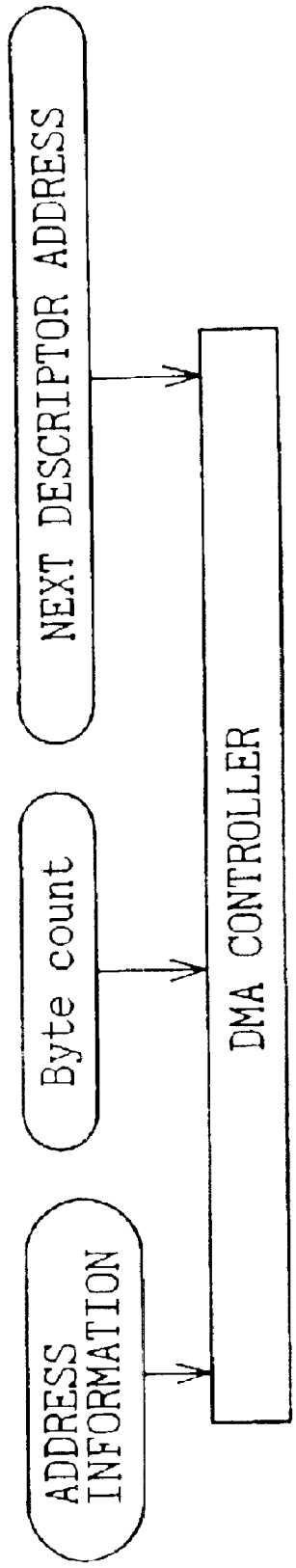
FIG. 25 is a diagram for explaining how the DMA controller fetches the descriptor information stored in the descriptor storage mechanism of FIG. 24.

The timing chart for the transfer timing of the descriptor information according to the present embodiment is the same as that shown in FIG. 8 relating to the earlier described first embodiment. On the other hand, if the descriptor chain is to be supported using the next descriptor address and without separating the descriptor information into the common information and individual information, as in the prior art shown in FIG. 24, the transfer timing of the descriptor information will be as shown in FIG. 19.

Figure 19:
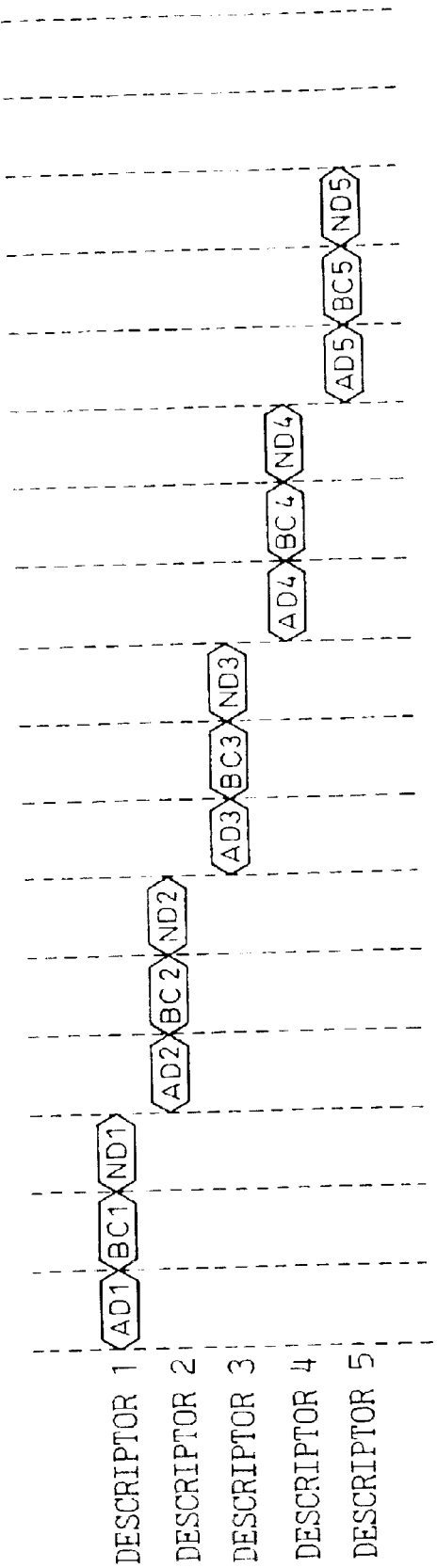
FIG. 19 is a timing chart showing the transfer timing of the descriptor information (for the case of a descriptor chain) according to the prior art.
Figure 20:
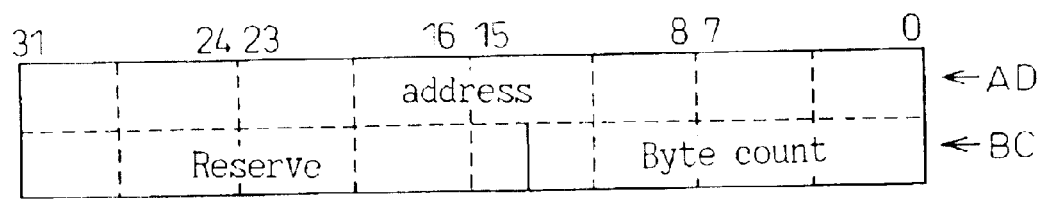
FIG. 20 is a format diagram showing a descriptor format according to the prior art.
Figure 21:
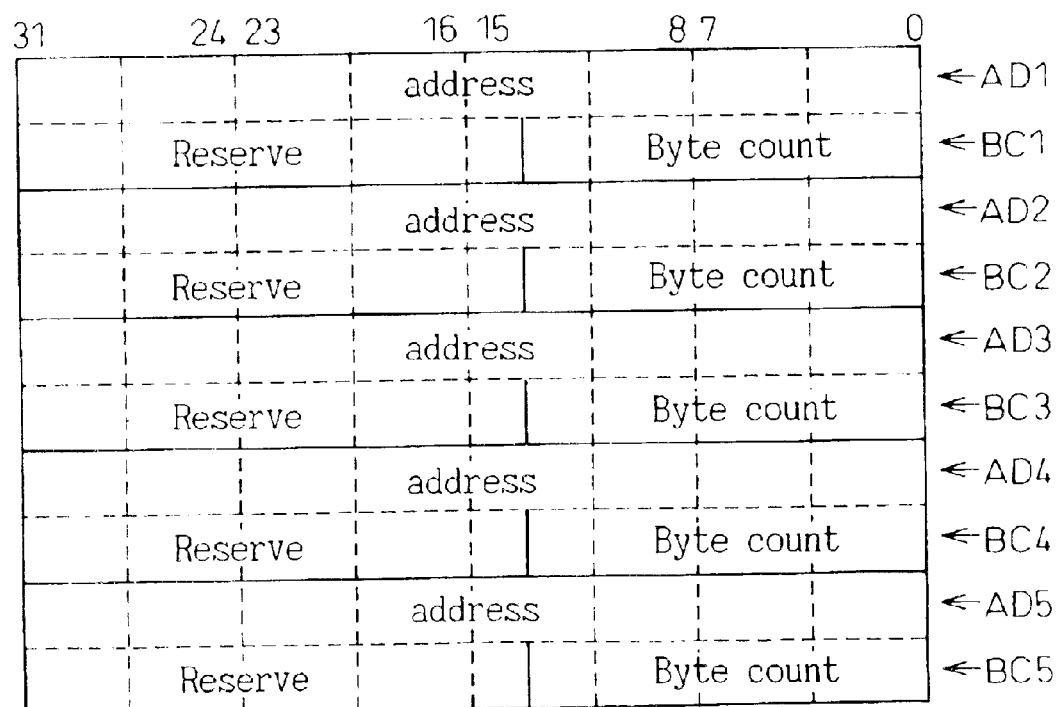
FIG. 21 is a schematic diagram showing a descriptor storage mechanism according to the prior art.
Figure 22:
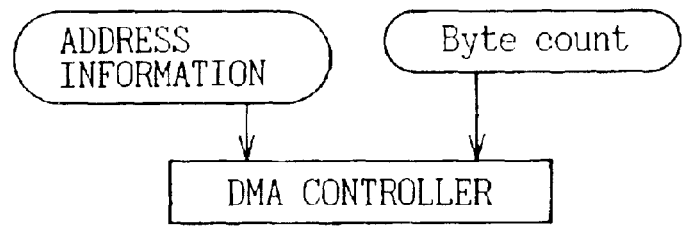
FIG. 22 is a diagram for explaining how a DMA controller fetches descriptor information according to the prior art.
Figure 23:
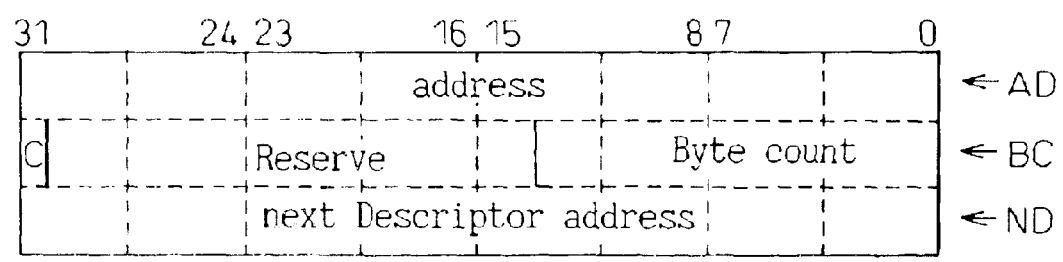
FIG. 23 is a format diagram showing another example of the descriptor format according to the prior art.

As is apparent from a comparison between FIG. 8 and FIG. 19, since there is no need to transfer the next descriptor address in the present embodiment, bus usage decreases, increasing the availability of the common bus for other processing operations, and system performance can thus be improved.

While specific embodiments of the invention have been described with reference to drawings, it will be appreciated that various modifications can be made by those skilled in the art; for example, the present invention can be applied to various data transfer devices other than the LAN card, and other communication networks such as ADSL networks can also be employed instead of the LAN.

The present invention has been described specifically dealing with embodiments in which the invention is applied to the DMA controller incorporated in a LAN card, but it will be recognized that the invention is not limited to the specific embodiments disclosed herein; for example, the invention can be applied extensively to self-contained general-purpose DMA controllers or to various terminals, workstations, etc. that form computer networks.

As described above, according to the present invention, by separating the descriptor information into common information and individual information and storing them separately, the necessary storage area can be reduced, which contributes to reducing the amount of hardware. Furthermore, as the descriptor common information need not be transferred each time a data transfer occurs, the amount of information to be transferred can be reduced, and bus usage thus decreases. As a result, the bus can be used for other processing operations, which serves to improve system performance.

Further, as a FIFO structure is employed in the descriptor chain, the next descriptor address is not needed; as a result, the amount of information to be carried in the descriptor decreases, and the size of the storage mechanism for storing the descriptor information decreases accordingly, achieving a reduction in the amount of hardware. Furthermore, as there is no need to transfer the next descriptor address, bus usage decreases, increasing the availability of the common bus for other processing operations, and system performance can thus be improved.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A data transfer apparatus which executes a DMA transfer by controlling a DMA controller through the use of a descriptor, comprising:
    a first storage mechanism for storing descriptor common information that can be shared among a plurality of descriptors;
    a second storage mechanism for storing descriptor individual information that differs for each individual descriptor; and
    a conversion circuit for taking as inputs the descriptor common information read out of said first storage mechanism and the descriptor individual information read out of said second storage mechanism, and for outputting descriptor information to be supplied to said DMA controller.

2. A data transfer apparatus according to claim 1, wherein said first storage mechanism is capable of storing a plurality of sets of said descriptor common information.

3. A data transfer apparatus according to claim 2, wherein said descriptor individual information includes selection information for selecting one of said plurality of sets of said descriptor common information.

4. A data transfer apparatus according to claim 3, wherein said descriptor common information includes information concerning a high-order address part of an address at which a DMA transfer is to be started.

5. A data transfer apparatus according to claim 4, wherein said descriptor individual information includes information concerning a low-order address part of the address at which said DMA transfer is to be started.

6. A data transfer apparatus according to claim 5, wherein said conversion circuit selects one of said plurality of sets of said descriptor common information based on said input descriptor individual information, creates address information by combining the high-order address part in said selected descriptor common information with the low-order address part in said descriptor individual information, and supplies said address information to said DMA controller.

7. A data transfer apparatus according to claim 1, wherein said descriptor individual information includes information concerning a byte count indicating the amount of DMA transfer data.

8. A data transfer apparatus according to claim 7, wherein said conversion circuit supplies the byte count in said input descriptor individual information to said DMA controller.

9. A data transfer apparatus according to claim 1, wherein said descriptor individual information includes chain information indicating the presence or absence of a descriptor chain.

10. A data transfer apparatus according to claim 9, wherein said second storage mechanism has a FIFO structure for storing a plurality of sets of said descriptor individual information.

11. A data transfer apparatus according to claim 10, wherein, when said chain information indicates the presence of a descriptor chain, said conversion circuit operates in a repeated manner.

12. A LAN card comprising a data transfer apparatus as described in claim 1.

13. A LAN card according to claim 12, comprising:
    an information processor equipped with a control mechanism and a storage mechanism having a DMA transfer data storage area;
    a DMA processor equipped with said first storage mechanism, said second storage mechanism, said conversion circuit, and said DMA controller; and
    a common bus connecting between said information processor and said DMA processor.

14. A server comprising a LAN card as described in claim 12.

15. A data transfer method for causing a DMA controller to execute a DMA transfer by controlling said DMA controller through the use of a descriptor, comprising the steps of:
    (a) storing, in a first storage mechanism, descriptor common information that can be shared among a plurality of descriptors;
    (b) storing, in a second storage mechanism, descriptor individual information that differs for each individual descriptor; and
    (c) generating descriptor information to be supplied to said DMA controller, based on the descriptor common information read out of said first storage mechanism and on the descriptor individual information read out of said second storage mechanism.

16. A data transfer method according to claim 15, wherein said step (a) stores a plurality of sets of said descriptor common information.

17. A data transfer method according to claim 16, wherein said descriptor individual information includes selection information for selecting one of said plurality of sets of said descriptor common information.

18. A data transfer method according to claim 17, wherein said descriptor common information includes information concerning a high-order address part of an address at which a DMA transfer is to be started.

19. A data transfer method according to claim 18, wherein said descriptor individual information includes information concerning a low-order address part of the address at which said DMA transfer is to be started.

20. A data transfer method according to claim 19, wherein said step (c) includes selecting one descriptor common information based on one descriptor individual information, creating address information by combining the high-order address part in said selected descriptor common information with the low-order address part in said descriptor individual information, and supplying said address information to said DMA controller.

21. A data transfer method according to claim 15, wherein said descriptor individual information includes information concerning a byte count indicating the amount of DMA transfer data.

22. A data transfer method according to claim 21, wherein said step (c) includes supplying the byte count in said descriptor individual information to said DMA controller.

23. A data transfer method according to claim 15, wherein said descriptor individual information includes chain information indicating the presence or absence of a descriptor chain.

24. A data transfer method according to claim 23, wherein said second storage mechanism has a FIFO structure for storing a plurality of sets of said descriptor individual information.

25. A data transfer method according to claim 24, wherein, when said chain information indicates the presence of a descriptor chain, said step (c) is carried out in a repeated manner.

* * * * *